(12) United States Patent
Malhotra et al.

(10) Patent No.: US 7,090,816 B2
(45) Date of Patent: Aug. 15, 2006

(54) LOW-DELTA P PURIFIER FOR NITROGEN, METHANE, AND ARGON REMOVAL FROM SYNGAS

(75) Inventors: Avinash Malhotra, Sugar Land, TX (US); Tufail Ahmad, Houston, TX (US); Bradley Richard Welter, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 392 days.

(21) Appl. No.: 10/604,404

(22) Filed: Jul. 17, 2003

(65) Prior Publication Data

US 2005/0013768 A1    Jan. 20, 2005

(51) Int. Cl.
  *F25J 1/00*    (2006.01)
  *C01C 1/04*    (2006.01)
  *F25B 19/02*   (2006.01)

(52) U.S. Cl. .................. 423/359; 62/51.2; 62/606; 62/616; 252/376

(58) Field of Classification Search ................ 423/359; 62/626, 616, 51.2; 252/376
See application file for complete search history.

(56) References Cited

U.S. PATENT DOCUMENTS

| | | |
|---|---|---|
| 3,442,613 A | 5/1969 | Grotz ............................ 57/34 |
| 3,549,335 A | 12/1970 | Grotz |
| 3,572,046 A | 3/1971 | Grotz |
| 4,296,085 A | 10/1981 | Banquy |
| 4,549,890 A | 10/1985 | Bligh |
| 4,568,530 A | 2/1986 | Mandelik et al. ........... 423/359 |
| 4,613,492 A | 9/1986 | Winter |
| 4,681,745 A | 7/1987 | Pinto ........................... 423/359 |
| 5,180,570 A | 1/1993 | Lee et al. .................... 423/359 |
| 5,935,544 A * | 8/1999 | Bhakta ........................ 423/359 |
| 6,178,774 B1 | 1/2001 | Billy et al. |

FOREIGN PATENT DOCUMENTS

JP         6-159931    *  6/1994

OTHER PUBLICATIONS

"New Kellogg Brown & Root Ammonia Process"; Gosnell, Jim and Malhotra, Avinash; Presentation at the AIChE Ammonia Safety Symposium, Seattle, Washington, Sep. 27-29, 1999; Unpublished.

* cited by examiner

*Primary Examiner*—Wayne A. Langel
(74) *Attorney, Agent, or Firm*—Lundeen & Dickenson, LLP; Bradley A. Misley

(57) ABSTRACT

A process for manufacturing ammonia from syngas with excess air for reforming and nitrogen removal with low pressure losses is disclosed. Auto-refrigeration for cooling the syngas for cryogenic hydrogen enrichment is provided by expansion of a hydrogen-lean waste fluid stream from a distillation column.

17 Claims, 4 Drawing Sheets

*(Retrofit)*

LOW-DELTA P PURIFIER FOR NITROGEN, METHANE, AND ARGON REMOVAL FROM SYNGAS

BACKGROUND OF INVENTION

This invention relates to a method and apparatus to improve production of synthesis gas for manufacturing ammonia. The invention reduces pressure losses in a nitrogen-wash purifier unit.

Processes for manufacturing ammonia from a hydrocarbon and air, via a hydrogen/nitrogen synthesis gas (syngas), are well known. Extraneous syngas components typically include inert gases from the air and/or the hydrocarbon feed, such as argon and methane. When excess air is used in the syngas production, nitrogen is also present in stoichiometric excess, and must be removed from a raw makeup syngas stream or purged from an ammonia synthesis loop to maintain a desired ammonia synthesis reactor feed composition.

U.S. Pat. No. 3,442,613 to Grotz discloses a syngas production method using excess air and cryogenic syngas purification, which relies on a syngas pressure drop upstream of purification for refrigeration. The pressure drop is subsequently made up in a compressor that raises the syngas to ammonia synthesis loop pressure. The method also reduces the rate of recycle or purge gas flow from the ammonia reactor loop due to the upstream removal from the makeup syngas of inerts such as argon and methane in the syngas purification.

U.S. Pat. No. 4,568,530 to Mandelik et al provides a method of ammonia synthesis using high-activity catalyst in the ammonia synthesis reactor. Purge gases are eliminated via a hydrogen enrichment process operating on a sidestream of the syngas recycled to the synthesis loop compressor. The total recycle flow is roughly three times the volumetric flowrate of the makeup syngas.

U.S. Pat. No. 4,681,745 to Pinto recommends using air separation to provide oxygen-enriched air such that reforming produces a synthesis gas with higher hydrocarbon slip than in other ammonia manufacturing systems. A higher concentration of nonreactive gas in the ammonia synthesis is managed by purging from a residual syngas stream following recovery of ammonia product. This approach unloads front-end gas reforming reactors, at the expense of including air separation, but ostensibly enables a smaller purge stream process after ammonia synthesis.

U.S. Pat. No. 5,180,570 to Lee et al describes an integrated process system for synthesizing methanol and ammonia. An ammonia synthesis section uses a nitrogen wash by cryogenic fractionation to purify ammonia syngas, with refrigeration supplied externally and providing no recovery of expansion power in the process.

Gosnell et al, "New Kellogg Brown & Root Ammonia Process," July 1999, presented at the AIChE Ammonia Safety Symposium, September 1999, describes an ammonia synthesis process utilizing cryogenic syngas purification integrated with an optimized plant front end for syngas generation and a high-activity ammonia catalyst in the synthesis.

SUMMARY OF INVENTION

The present invention provides a method to purify syngas, for example, such as occurs in ammonia manufacturing processes. The method uses cryogenic distillation to purify syngas, and obtains refrigeration for the distillation from waste fluid expansion using a liquid expander to recover mechanical work from the waste fluid. This method reduces the pressure losses in the syngas stream and concomitantly reduces compression costs and power relative to similar prior art ammonia processes utilizing nitrogen and inerts removal.

The method of this invention is particularly applicable in grassroots plant design, and can also be preferably applied to retrofit existing synthesis gas systems to improve process performance and economics. In the retrofit, for example, the lower pressure drop of the invention can allow process modification for reforming with excess air and nitrogen removal from the makeup syngas without expensive modification or replacement of the synthesis loop and/or makeup gas compressors.

In one embodiment, the present invention provides a method to purify syngas, including: (a) introducing a raw syngas stream containing excess nitrogen to a feed zone in a distillation column; (b) expanding a liquid bottoms stream from the distillation column through a liquid expander with a work output to form a cooled waste fluid stream; (c) rectifying vapor from the feed zone in the distillation column to form an overhead vapor stream of reduced nitrogen and inerts content; (d) cooling the overhead vapor stream in indirect heat exchange with the cooled waste fluid stream to form a partially condensed overhead stream and a relatively warm waste fluid stream; (e) separating the partially condensed overhead stream into a condensate stream and a purified syngas vapor stream of reduced nitrogen and inerts content; and (f) refluxing the distillation column with the condensate stream. The method can also include cooling the raw syngas stream by expansion across a Joule-Thompson (J-T) valve in advance of the introduction to the feed zone. Additionally, the method can include cooling the raw syngas stream in cross-exchange against the warm waste fluid stream and against the purified syngas vapor stream. In this embodiment, adjusting the flow to the liquid bottoms stream expansion controls liquid level in the distillation column.

The method can further include producing the raw synthesis gas by reforming a hydrocarbon, wherein the reforming includes autothermal or secondary reforming with excess air. And by this method, the purified syngas vapor stream can be supplied to an ammonia synthesis loop for manufacturing ammonia.

In another embodiment, the present invention provides an ammonia process, including: (a) reforming a hydrocarbon to form syngas, wherein the reforming includes autothermal or secondary reforming with excess air to form a raw syngas stream containing excess nitrogen for ammonia synthesis; (b) cooling the raw syngas stream in a cross-exchanger; (c) expanding the cooled raw syngas stream from the cross-exchanger; (d) introducing the expanded raw syngas stream to a feed zone in a distillation column; (e) expanding a liquid bottoms stream from the distillation column through a liquid expander to form a cooled waste fluid stream; (f) rectifying vapor from the feed zone in the distillation column to form an overhead vapor stream of reduced nitrogen and inerts content; (g) cooling the overhead vapor stream in indirect heat exchange with the cooled waste fluid stream to form a partially condensed overhead stream and a partially warmed waste fluid stream; (h) separating the partially condensed overhead stream into a condensate stream and a purified syngas vapor stream of reduced nitrogen and inerts content; (i) refluxing the distillation column with the condensate stream; (j) heating the purified syngas vapor stream in the cross-exchanger; (k) heating the partially warmed waste fluid stream in the cross exchanger; (l) supplying the purified syngas vapor stream from the cross-exchanger to an ammonia synthesis loop.

In another embodiment, the present invention can be applied to improve an ammonia process that includes the steps of reforming a hydrocarbon with excess air to form a raw syngas stream, removing nitrogen and inerts from the raw syngas stream by distillation, wherein cooling is provided by process fluid expansion through an expander-generator, and wherein an overhead stream is partially condensed against a waste stream cooled by expanding bottoms liquid from a distillation column, and supplying syngas with reduced nitrogen and inerts content from the distillation to an ammonia synthesis loop. In this embodiment, improvements to the ammonia process include: (a) optionally expanding the raw syngas stream across a joule-Thompson valve upstream of the distillation column; and (b) expanding the bottoms liquid through a liquid expander with a work output.

In another embodiment the present invention provides a purification apparatus for purifying a raw syngas stream containing excess nitrogen, including: means for introducing the raw syngas stream to a feed zone in a distillation column; means for expanding a liquid bottoms stream from the distillation column to form a cooled waste fluid stream; means for rectifying vapor from the feed zone in the distillation column to form an overhead vapor stream of reduced nitrogen and inerts content; means for cooling the overhead vapor stream in indirect heat exchange with the cooled waste fluid stream to form a partially condensed overhead stream and a relatively warm waste fluid stream; means for separating the partially condensed overhead stream into a condensate stream and a purified syngas vapor stream of reduced nitrogen and inerts content; and means for refluxing the distillation column with the condensate stream.

In a further embodiment, the invention provides an ammonia process plant, including: (a) means for reforming a hydrocarbon to form syngas, wherein the reforming means includes an autothermal or secondary reformer and means for supplying excess air to the autothermal or secondary reformer, to form a raw syngas stream containing excess nitrogen for ammonia synthesis; (b) cross-exchanger means for cooling the raw syngas stream; (c) means for expanding the cooled raw syngas stream from the cross-exchanger; (d) means for introducing the expanded raw syngas stream to a feed zone in a distillation column; (e) means for expanding a liquid bottoms stream from the distillation column through a liquid expander to form a cooled waste fluid stream; (f) means for rectifying vapor from the feed zone in the distillation column to form an overhead vapor stream of reduced nitrogen and inerts content; (g) means for cooling the overhead vapor stream in indirect heat exchange with the cooled waste fluid stream to form a partially condensed overhead stream and a partially warmed waste fluid stream; (h) means for separating the partially condensed overhead stream into a condensate stream and a purified syngas vapor stream of reduced nitrogen and inerts content; (i) means for refluxing the distillation column with the condensate stream; (j) means for heating the purified syngas vapor stream in the cross-exchanger; (k) means for heating the partially warmed waste fluid stream in the cross exchanger; and (l) means for supplying the purified syngas vapor stream from the cross-exchanger to an ammonia synthesis loop.

DETAILED DESCRIPTION

Figure 1:
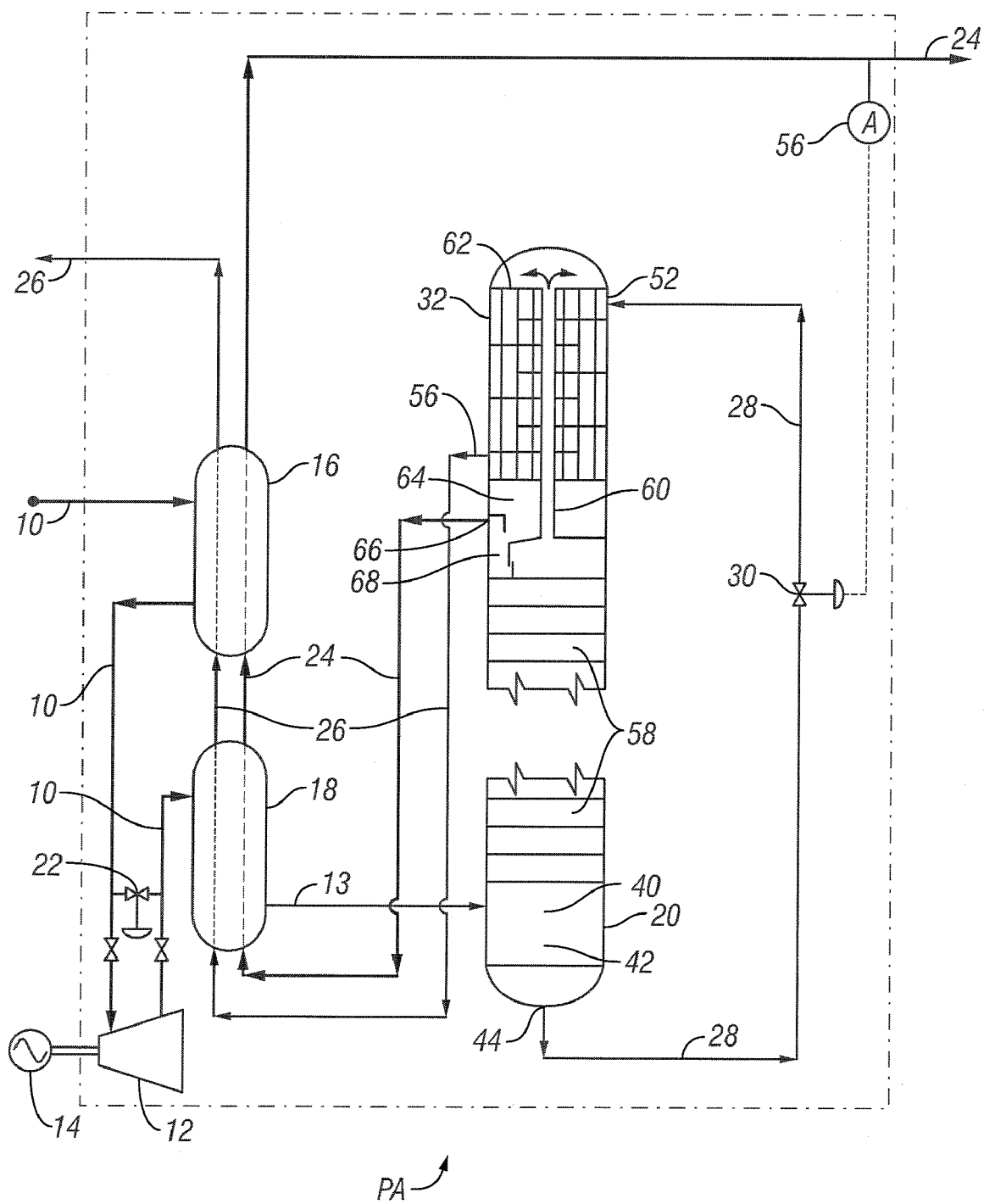
FIG. 1 is a schematic process flow sheet showing prior art syngas purification using an upstream syngas feed to drive an expander and extract syngas energy as work to achieve auto-refrigeration.
Figure 2:
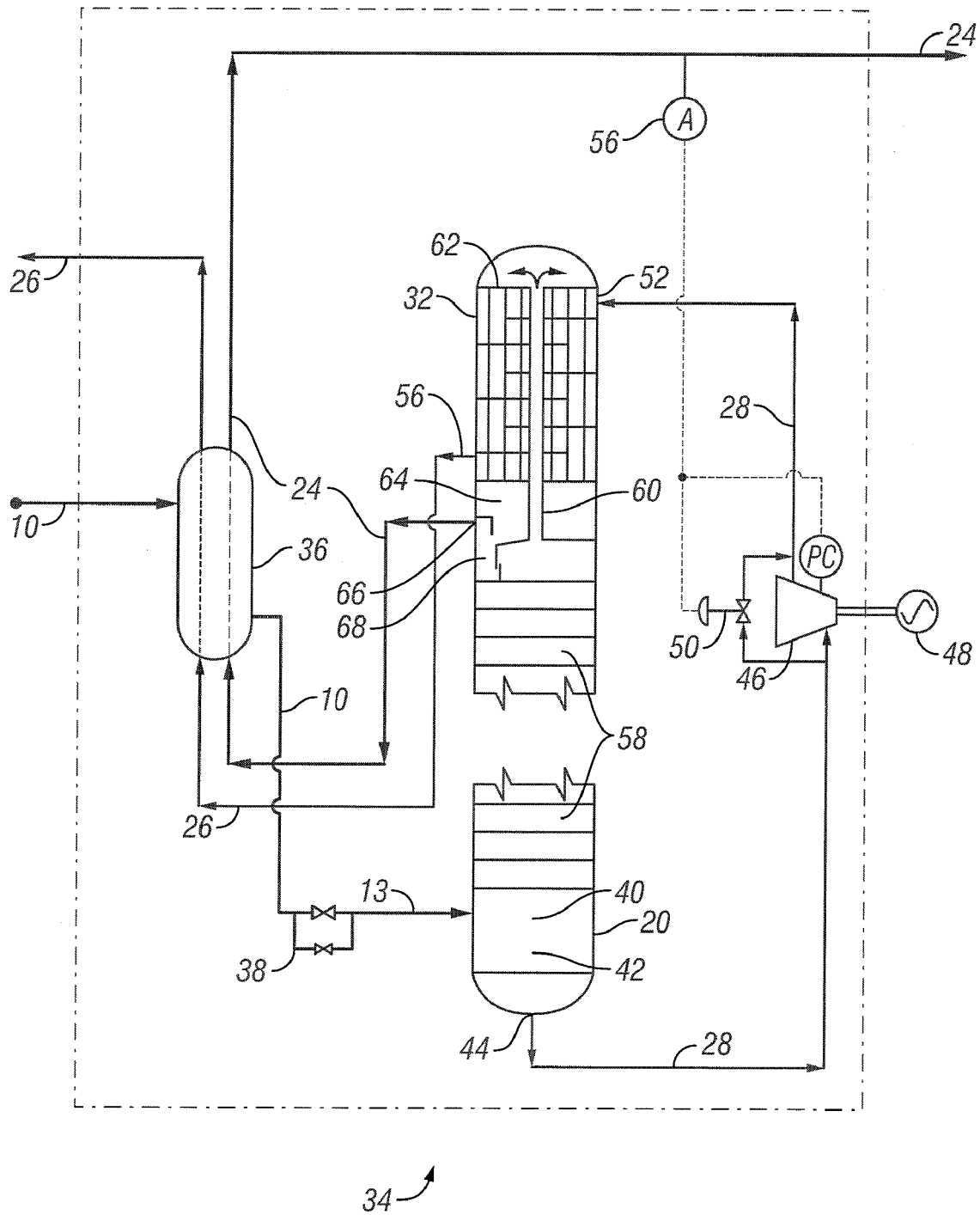
FIG. 2 is a schematic process flow sheet of an embodiment of the present invention, using expansion of a nitrogen-rich liquid waste stream to generate auto-refrigeration in the process.
Figure 3:
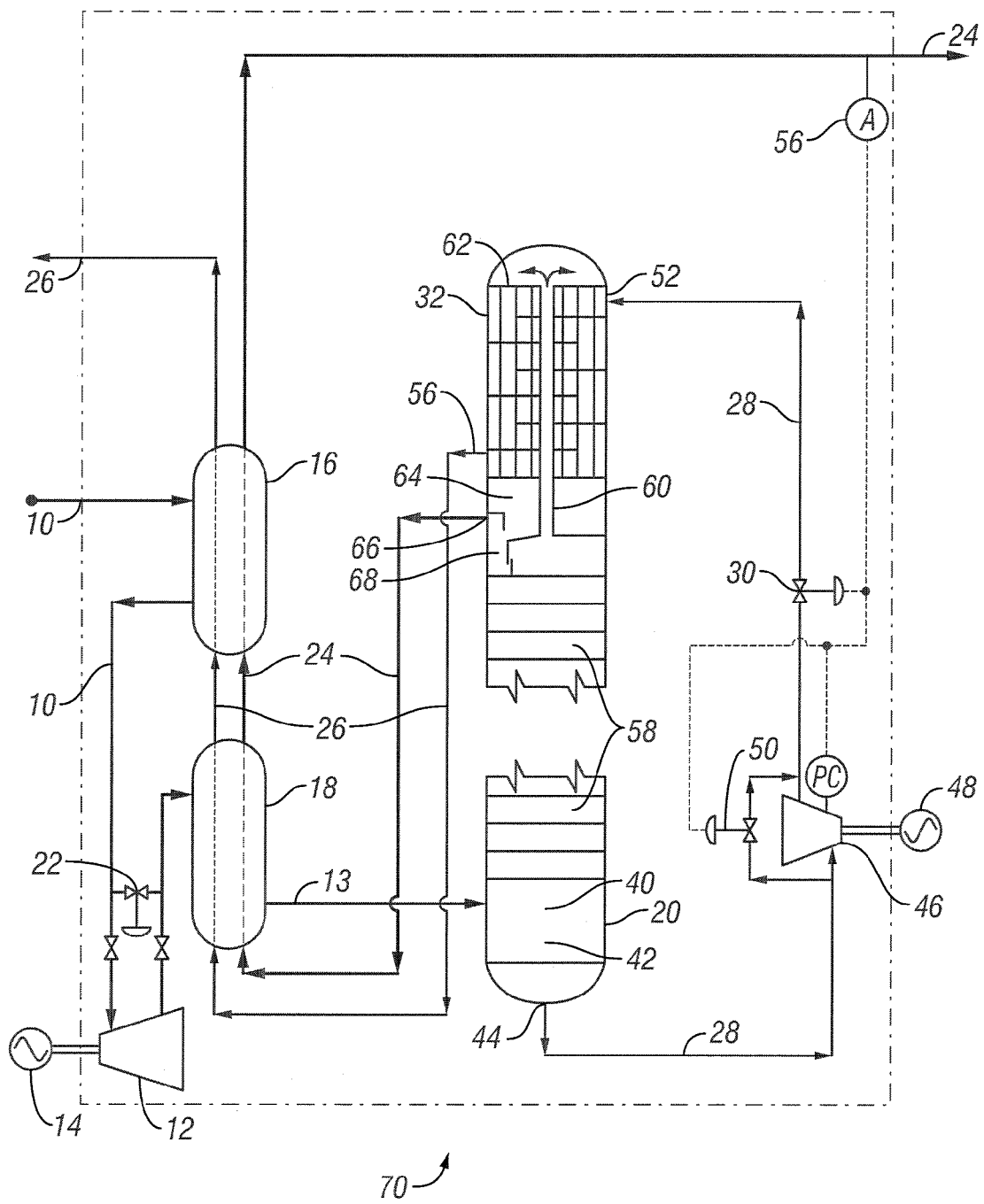
FIG. 3 is a schematic process flow sheet showing an alternate embodiment of the present invention wherein syngas feed or liquefied waste gas can be expanded across a liquid expander for refrigeration.

With reference to FIGS. 1–3 wherein similar streams and elements are similarly numbered, FIG. 1 depicts prior art syngas purification PA. A syngas feed stream 10 drives expander 12, extracting syngas energy as work 14 to achieve auto-refrigeration. The feed stream 10 is chilled in cross-exchangers 16, 18 by indirect heat transfer with cold product streams from a distillation column 20. Between the cross-exchangers 16, 18, the raw syngas 10 is expanded in a turboexpander 12, cooling the raw syngas 10 and recovering work 14. The expander 12 can be bypassed or supplemented by using a joule-Thompson (J-T) valve 22, for example during startup. The partially liquefied raw syngas 13 from the cross-exchanger 18 enters the distillation column 20 to be further cooled, partly condensed, and rectified, yielding a purified syngas stream 24 of lowered nitrogen and inerts content and a hydrogen-lean waste gas stream 26. The purified syngas stream 24 and waste gas stream 26 pass through the cross-exchangers 16, 18 to chill the raw syngas feed stream 10 as mentioned previously.

The waste gas stream 26 is discharged from the distillation column 20 as bottoms stream 28, flashed across level control valve 30, and used as a coolant in a heat exchanger 32 integral with the distillation column 20. The heat exchanger 32 cools and partially condenses overhead vapor from the column 20 to obtain syngas liquid to reflux the column 20. The makeup syngas stream 24 is compressed for conversion in ammonia synthesis reactors (not shown) that operate at higher pressures. Thus, a pressure drop incurred by the raw syngas 10 in the purification PA must be recouped downstream by consuming additional power for compression.

FIG. 2 depicts an embodiment of syngas purification 34 according to the present invention, using mechanical expansion of the liquid bottoms stream 28 to generate a major fraction of the auto-refrigeration in the purification process 34. A single cross-exchanger 36 is used in place of the cross-exchangers 16, 18 of FIG. 1, although cross-exchanger 36 can include a plurality of physical stages. The raw syngas stream 10 is passed through valve station 38 upstream of the distillation column 20. The valve station 38 can include a primary, line-size valve for flow during normal operation, and a J-T secondary valve for trim and/or startup for auto-refrigeration. The raw syngas stream 10 then enters an inlet zone 40 of the column 20, preferably as a mixture of syngas vapor and liquid. In the inlet zone 40, syngas liquid separates and is collected in liquid holdup zone 42. The liquid exits the column 20 as bottoms stream 28 via a lower outlet 44. The column bottoms stream 28 is expanded through a liquid expander 46 to auto-refrigerate the bottoms 28 and recover work 48, which can be used to drive a pump, compressor, electrical generator, or the like. As used herein, a "liquid expander" is a work-output device that receives a liquid supply and produces a liquid or vapor effluent, preferably a mixed vapor-liquid effluent. Where the effluent fluid is liquid, the liquid expander 46 can be a hydraulic turbine.

A bypass J-T valve 50 is included for gas or two-phase flow, e.g. at startup. In operation, expansion of the bottoms stream 28 is preferably a primary source of auto-refrigeration in the syngas purification process 34 of the present invention, whereas the expansion across the bypass J-T valve at valve station 38 is a relatively minor source. However, the bypass J-T valve can be a significant refrigeration source during startup.

From liquid expander 46, the chilled waste fluid stream 28 enters a coolant inlet 52 of an indirect heat exchange zone 32 integral to the column 20. The flow rate to the liquid expander 46 controls the liquid level in the holdup zone 42 and also, in part, regulates conditions in the column 20, based on feedback from a syngas analyzer 56. Conditions in the column 20 determine the composition of the purified syngas stream 24, i.e. more refrigeration reduces the nitrogen content and less refrigeration increases it. The chilled waste fluid stream 28 passes through the heat exchange zone 32, discharging from the column 20 via coolant outlet 56. During transit through the heat exchange zone 32, the bottoms stream 28 cools and partially condenses overhead vapor from the column 20.

From the inlet zone 40, syngas vapor flows upward through a contact zone 58 in contact with liquid flowing downward through the contact zone 58 to absorb nitrogen and enrich the hydrogen content of the vapor. At the upper end of the contact zone 58, the vapor enters a vapor riser 60 and flows to a vapor inlet zone 62 at an upper end of the heat exchange zone 32. The vapor passes tube-side through the heat exchange zone 32 for partial condensation against the waste fluid stream 28, further enriching the vapor in lower-boiling components. Vapor and condensate exit the heat exchange zone 32 and are separated in a knockout zone 64. Vapor exits the column 20 as the purified syngas stream 24, discharging via syngas outlet 66. The condensate collects in a liquid seal well 68 below the knockout zone 64 and in communication with the contact zone 58. The condensate overflows from the seal well 68 to flow downward through the contact zone 58 to the liquid holdup zone 42 as described previously.

FIG. 3 depicts another embodiment of a syngas purification process 70, in which the process PA of FIG. 1 can be modified or retrofitted according to the present invention. A bottoms liquid expander 46 is added to auto-refrigerate the bottoms stream 28 by recovering work, for example as power 48. A bypass J-T valve 50 is also installed, as in FIG. 2. The resulting retrofit purification process 70 is comparable to the inventive embodiment of FIG. 2, but can also be operated in the original configuration, if desired. For low pressure drop operation, the original syngas turboexpander 12 is bypassed and the valve 22 is set full open, or optionally bypassed (not shown).

In a preferred embodiment of the present invention, expansion of a liquid byproduct stream of purged gases, i.e. the column bottoms stream 28, generates a major portion of the auto-refrigeration required for the purification process. This avoids a major part of the syngas pressure loss incurred in the prior art configuration of FIG. 1. In the prior art process PA, a pressure drop of about 3.1 bars typically occurs from introduction of the syngas feed stream 10 to exit of the purified syngas stream 24. Most of this occurs across the expander 12, which drops the raw syngas pressure by about 1.8 to 2.0 bar. In the embodiment of the present invention seen in FIG. 2, a pressure drop from introduction of the syngas feed stream 10 to exit of the purified syngas stream 24, can be limited to a range of about 0.75 to 1.3 bar by obtaining a major portion of the required auto-refrigeration effect from expansion of the column bottoms stream 28 instead of from the raw syngas feed stream 10.

Figure 4:
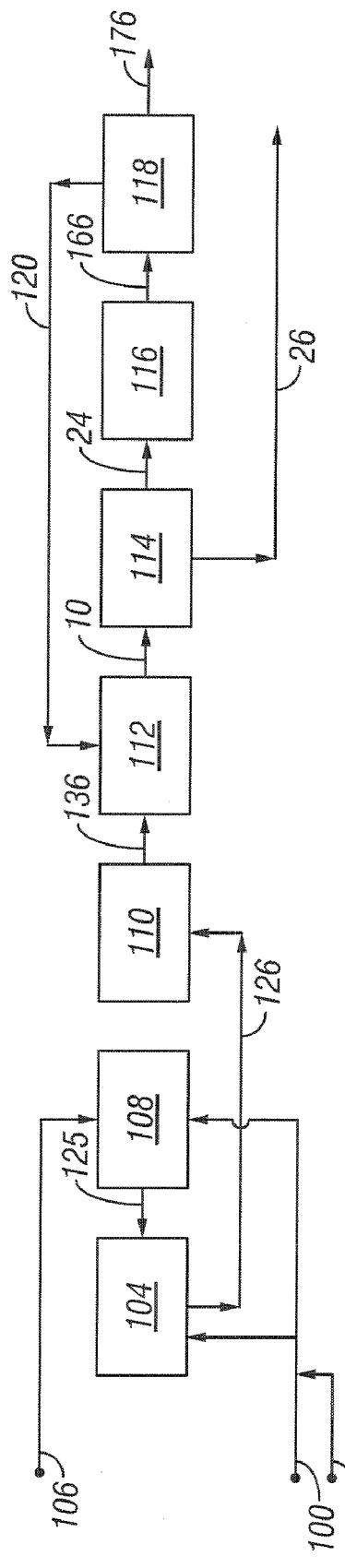
FIG. 4 is a block flow diagram of an embodiment of the invention showing low pressure drop nitrogen removal integrated in an ammonia synthesis process with secondary reforming with excess air and heat-exchanging reforming.

Referring to FIG. 4, an embodiment of an ammonia manufacturing process can include catalytic reforming of a feed including hydrocarbon 100 and steam 102 in a reactor/exchanger 104 of the type known under the trade designation KRES. Additional reforming of a feed including hydrocarbon 100 and steam 102 with excess air 106 as oxidant can be effected in secondary reformer 108. The process can also include high and/or low temperature shift conversion and carbon dioxide removal 110, methanation and drying 112, syngas purification 114 as described in reference to FIG. 2 or 3, compression 116, and ammonia synthesis 118. A purge stream 120 is recycled from the ammonia synthesis 118 to upstream of the syngas purification 114, e.g. to the methanation and drying 112. The recycled stream 120 can be relatively smaller in mass flow rate than the raw syngas stream 10 (see FIG. 2), for example, in a range of from about 5 weight percent to 25 weight percent of the raw syngas stream 10, and preferably in a range of from 10 to 20 weight percent of the raw stream 10. The waste gas stream 26 can be exported for fuel gas value.

Figure 5:
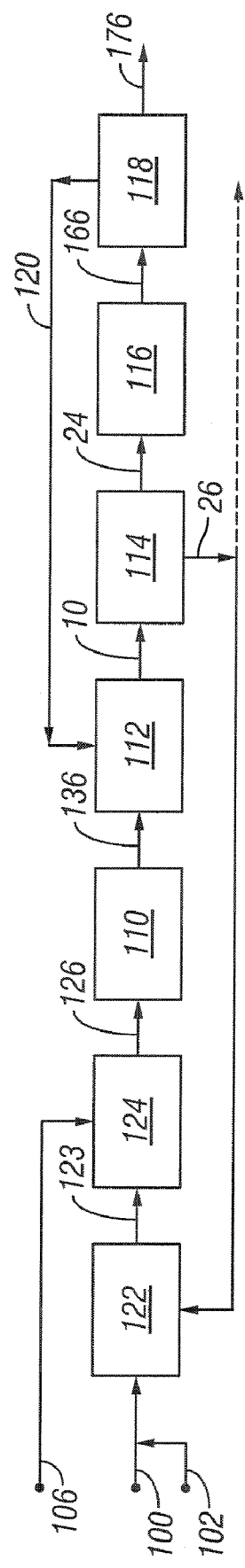
FIG. 5 is block flow diagram of an alternative embodiment of the invention showing low pressure drop nitrogen removal integrated in an ammonia synthesis process with conventional primary steam reforming and secondary reforming with excess air.

Referring to FIG. 5, another embodiment of an ammonia manufacturing process can include catalytic reforming of a feed including hydrocarbon 100 and steam 102 in a conventional primary reformer 122 followed by additional reforming with excess air 106 in conventional secondary catalytic reformer 124. Shift conversion and carbon dioxide removal 110, methanation and drying 112, syngas purification 114, compression 116, ammonia synthesis 118 and purge stream 120 recycle are as described in reference to FIG. 4. Waste gas stream 26 can be burned as a fuel in primary reformer 122 and/or exported for fuel gas as in FIG. 4.

The purification process of FIG. 2 can be used in a new plant for improved energy consumption and capital cost savings, or can be used to retrofit an existing purification process like that of FIG. 1 to reduce operating costs and/or to increase capacity. The process of FIG. 2 can also be used to retrofit an existing plant that does not use purification and/or excess air. Retrofitting for reforming with excess air can increase the capacity of the existing plant and enhance the life of the tubes and/or other internals in the existing reformer(s) by shifting some of the reforming duty to the secondary reformer and lowering the operating temperature of the primary reformer. Installing nitrogen removal also allows for more flexible reforming operation (e.g. higher methane slip), and less purge or recycle from the ammonia synthesis loop due to the reduction of inerts with the nitrogen removal. Nitrogen purification/excess air retrofits using the low-$\Delta P$ purification process of the present invention can improve the retrofit by reducing or eliminating the extent of modifications to the makeup syngas compressor, which can make the retrofit economically feasible for a larger number of existing ammonia plants.

EXAMPLE

The purification method of the present invention embodiment of FIG. 2 is compared to that of the prior art in FIG. 1. Both FIGS. 1 and 2 process a raw syngas feed stream 10 to produce a purified syngas stream 24 and a waste gas stream 26, and the inlet and outlet stream compositions are the same in both cases as shown in Table 1 below.

TABLE 1

Purification Syngas Specifications

| Gas Component | Stream Composition, mole percent | | |
|---|---|---|---|
| | Raw Syngas (10) | Purified Syngas (24) | Waste Gas (26) |
| Hydrogen | 65.8 | 74.7 | 6.6 |
| Nitrogen | 31.4 | 24.9 | 74.2 |
| Methane | 2.2 | 0.006 | 16.7 |
| Argon | 0.6 | 0.4 | 2.5 |
| Total | 100.0 | 100.0 | 100.0 |

Operation of the low-ΔP process of FIG. 2 was simulated for a 2200 metric tons per day ammonia plant to compare the operating temperatures, pressures and flow rates to those of the FIG. 1 prior art process as a base case. The results are shown in Table 2 below.

TABLE 2

Purification Operating Conditions
Basis: 2200 MTPD Ammonia

| Process Stream, Location | Base Case (FIG. 1) | Example (FIG. 2) |
|---|---|---|
| RAW SYNGAS (10), INLET TO CROSS-EXCHANGER (20) | | |
| Temperature, ° C. | 4.0 | 4.0 |
| Pressure, kPa | 3,479.0 | 3,479.0 |
| Mass flow, kg/hr | 142,124 | 142,124 |
| RAW SYNGAS (10), INLET TO COLUMN (20) | | |
| Temperature, ° C. | −172.6 | −172.0 |
| Pressure, kPa | 3,240.0 | 3,454.0 |
| Mass flow, kg/hr | 142,124 | 142,124 |
| SYNGAS (24), OUTLET FROM COLUMN (20) | | |
| Temperature, ° C. | −178.6 | −178.2 |
| Pressure, kPa | 3,215.0 | 3,429.0 |
| Mass flow, kg/hr | 99,607 | 99,529 |
| SYNGAS (24), OUTLET FROM CROSS-EXCHANGER (16, 20) | | |
| Temperature, ° C. | 1.3 | 2.1 |
| Pressure, kPa | 3,165.0 | 3,404.0 |
| Mass flow, kg/hr | 99,607 | 99,529 |
| BOTTOMS LIQUID (28), OUTLET FROM COLUMN (20) | | |
| Temperature, ° C. | −172.8 | −172.2 |
| Pressure, kPa | 3,240.0 | 3,454.0 |
| Mass flow, kg/hr | 42,517 | 42,596 |

TABLE 2-continued

Purification Operating Conditions
Basis: 2200 MTPD Ammonia

| Process Stream, Location | Base Case (FIG. 1) | Example (FIG. 2) |
|---|---|---|
| WASTE FLUID (26), INLET TO EXCHANGER (32) | | |
| Temperature, ° C. | −186.0 | −187.6 |
| Pressure, kPa | 319.0 | 302.1 |
| Mass flow, kg/hr | 42,517 | 42,596 |
| WASTE FLUID (26), OUTLET FROM CROSS-EXCHANGER (16, 36) | | |
| Temperature, ° C. | 1.3 | 2.1 |
| Pressure, kPa | 256.4 | 253.3 |
| Mass flow, kg/hr | 42,517 | 42,596 |

The data in Table 2 show that the flow rates and temperatures are similar, but the pressure drop for the syngas between the purification process inlet and outlet is considerably lower in the FIG. 2 example compared to the FIG. 1 base case. This will generally require less makeup gas compression to the ammonia synthesis loop pressure. The power requirements for makeup syngas compression, fluid expansion power output, and net compression and expansion were also determined for the FIG. 1 base case and the FIG. 2 example. The results are shown in Table 3 below.

TABLE 3

Power Balance
Basis: 2200 MTPD Ammonia

| Compression/Expansion | Base Case (FIG. 1) | Example (FIG. 2) |
|---|---|---|
| MAKEUP SYNGAS COMPRESSION, KW | 8,310.66 | 7,453.49 |
| RAW SYNGAS EXPANSION, KW | −203.39 | — |
| WASTE FLUID EXPANSION, KW | — | −120.40 |
| NET COMPRESSION/EXPANSION POWER, KW | 8,107.27 | 7,333.09 |

As seen in the data presented above, the purification process of FIG. 2 is characterized by a lower syngas pressure drop than the prior art process of FIG. 1. While less power is recovered from expansion of the waste fluid in the example of FIG. 2 than in the syngas feed expansion in the base case of FIG. 1, the reduction in makeup compression power is more significant. Thus, not only is the syngas pressure drop reduced, but the overall power requirements are also less, potentially resulting in both capital and operating cost savings in a new ammonia plant. In a retrofit of an existing non-purifier based ammonia plant, the reduced pressure drop of the FIG. 2 example can result in increased capacity and/or less significant or no modification of the makeup syngas compressor.

The invention is described above with reference to non-limiting examples provided for illustrative purposes only. Various modifications and changes will become apparent to the skilled artisan in view thereof. It is intended that all such changes and modifications are within the scope and spirit of the appended claims and shall be embraced thereby.

The invention claimed is:
1. A method to purify syngas, comprising:
introducing a raw syngas stream containing excess nitrogen to a feed zone in a distillation column;

expanding a liquid bottoms stream from the distillation column through a liquid expander with a work output to form a cooled waste fluid stream;

rectifying vapor from the feed zone in the distillation column to form an overhead vapor stream of reduced nitrogen and inerts content;

cooling the overhead vapor stream in indirect heat exchange with the cooled waste fluid stream to form a partially condensed overhead stream and a relatively warm waste fluid stream;

separating the partially condensed overhead stream into a condensate stream and a purified syngas vapor stream of reduced nitrogen and inerts content; and refluxing the distillation column with the condensate stream.

2. The method of claim 1, further comprising cooling and expanding the raw syngas stream across a Joule-Thompson valve in advance of the introduction to the feed zone.

3. The method of claim 2 wherein the cooling of the raw syngas stream includes cross-exchange against the warm waste fluid stream and against the purified syngas vapor stream.

4. The method of claim 1 wherein a liquid level in the distillation column is controlled by adjusting flow to the liquid bottoms stream expansion.

5. The method of claim 1, wherein the waste fluid from the liquid expander comprises mixed vapor and liquid.

6. The method of claim 5 wherein the warm waste fluid from the overhead vapor cooling consists of a vapor phase.

7. The method of claim 1 wherein the liquid expander comprises a hydraulic turbine.

8. The method of claim 1, further comprising producing the raw synthesis gas by reforming a hydrocarbon, wherein the reforming includes autothermal or secondary reforming with excess air.

9. The method of claim 1, further comprising supplying the purified syngas vapor stream to an ammonia synthesis loop to form ammonia.

10. An ammonia process, comprising:
reforming a hydrocarbon to form syngas, wherein the reforming includes autothermal or secondary reforming with excess air to form a raw syngas stream containing excess nitrogen for ammonia synthesis;

cooling the raw syngas stream in a cross-exchanger;

expanding the cooled raw syngas stream from the cross-exchanger;

introducing the expanded raw syngas stream to a feed zone in a distillation column;

expanding a liquid bottoms stream from the distillation column through a liquid expander to form a cooled waste fluid stream;

rectifying vapor from the feed zone in the distillation column to form an overhead vapor stream of reduced nitrogen and inerts content;

cooling the overhead vapor stream in indirect heat exchange with the cooled waste fluid stream to form a partially condensed overhead stream and a partially warmed waste fluid stream;

separating the partially condensed overhead stream into a condensate stream and a purified syngas vapor stream of reduced nitrogen and inerts content;

refluxing the distillation column with the condensate stream;

heating the purified syngas vapor stream in the cross-exchanger;

heating the partially warmed waste fluid stream in the cross exchanger;

supplying the purified syngas vapor stream from the cross-exchanger to an ammonia synthesis loop.

11. The method of claim 10, wherein the waste fluid from the liquid expander comprises mixed vapor and liquid.

12. The method of claim 11 wherein the warm waste fluid from the overhead vapor cooling consists of a vapor phase.

13. The method of claim 10 wherein the liquid expander comprises a hydraulic turbine.

14. In an ammonia process including the steps of reforming a hydrocarbon with excess air to form a raw syngas stream, removing nitrogen and inerts from the raw syngas stream by distillation wherein cooling is provided by process fluid expansion through an expander generator and wherein an overhead stream is partially condensed against a waste stream cooled by expanding bottoms liquid from a distillation column, and supplying syngas with reduced-nitrogen and inerts content from the distillation to an ammonia synthesis loop, the improvement wherein the bottoms liquid is expanded through a liquid expander with a work output.

15. The ammonia process of claim 14, wherein waste fluid from the liquid expander comprises mixed vapor and liquid.

16. The ammonia process of claim 14 wherein the liquid expander comprises a hydraulic turbine.

17. The ammonia process of claim 14, further comprising expanding the raw syngas across a Joule-Thompson valve upstream of the distillation column.

* * * * *